(12) United States Patent
Rippelmeyer (10) Patent No.: US 10,753,430 B2
(45) Date of Patent: Aug. 25, 2020

(54) MULTISPEED AUTOMATIC TRANSMISSION FOR ELECTRIFIED VEHICLES

(71) Applicant: Toyota Motor North America, Inc., Plano, TX (US)

(72) Inventor: Luke A. Rippelmeyer, Farmers Branch, TX (US)

(73) Assignee: Toyota Motor North America, Inc., Plano, TX (US)

( * ) Notice: Subject to any disclaimer, the term of this patent is extended or adjusted under 35 U.S.C. 154(b) by 0 days.

(21) Appl. No.: 16/168,917

(22) Filed: Oct. 24, 2018

(65) Prior Publication Data

US 2020/0132170 A1 Apr. 30, 2020

(51) Int. Cl.
*F16H 3/64* (2006.01)
*F16H 3/46* (2006.01)

(52) U.S. Cl.
CPC ....... *F16H 3/46* (2013.01); *F16H 2200/0021* (2013.01); *F16H 2200/0034* (2013.01); *F16H 2200/2007* (2013.01); *F16H 2200/2035* (2013.01); *F16H 2200/2097* (2013.01)

(58) Field of Classification Search
CPC ............... F16H 3/64; F16H 2200/0034; F16H 2200/2007; F16H 2200/2033; F16H 2200/2097

See application file for complete search history.

(56) References Cited

U.S. PATENT DOCUMENTS 3,986,413 A * 10/1976 Stockton ............... F16H 47/085
475/54
4,479,404 A * 10/1984 Stockton ................... F16H 3/66
475/149

(Continued)

FOREIGN PATENT DOCUMENTS

| DE | 102013226474 A1 | 6/2015 |
| DE | 102014215869 A1 | 2/2016 |
| DE | 102016222893 A1 | 5/2018 |

OTHER PUBLICATIONS

Portion of p. 1 of https://auto.howstuffworks.com/automatic-transmission2.htm (Year: 2019).*

*Primary Examiner* — Stacey A Fluhart
(74) *Attorney, Agent, or Firm* — Christopher G. Darrow; Darrow Mustafa PC (57) ABSTRACT

A transmission includes a first planetary gear set and a second planetary gear set that are the only planetary gear sets interconnected from an input to an output. The first planetary gear set includes an input-only first input gear and a first non-input/output gear, a first pinion gear meshed therebetween, and a first output planetary carrier carrying the first pinion gear. The first output planetary carrier is alternatively output-only or output-and-input. Moreover, the first non-input/output gear is alternatively held when the first output planetary carrier is output-only or released when the first output planetary carrier is output-and-input. The second planetary gear set includes an input-only second input gear and a grounded second non-input/output gear, a second pinion gear meshed therebetween, and an output-only second output planetary carrier carrying the second pinion gear.

20 Claims, 3 Drawing Sheets

(56) References Cited

U.S. PATENT DOCUMENTS

| | | | | |
|---|---|---|---|---|
| 5,514,044 A | * | 5/1996 | Antonov | F16D 13/74 |
| | | | | 475/257 |
| 6,363,807 B1 | * | 4/2002 | Takahashi | F16D 25/0638 |
| | | | | 192/105 C |
| 8,475,317 B2 | * | 7/2013 | Janson | F02B 67/04 |
| | | | | 475/210 |
| 8,517,882 B2 | * | 8/2013 | Wenthen | B60K 17/06 |
| | | | | 475/213 |
| 8,986,156 B1 | | 3/2015 | Hwang et al. | |
| 2012/0244988 A1 | | 9/2012 | Aota et al. | |
| 2013/0296088 A1 | * | 11/2013 | Savage | B60K 6/365 |
| | | | | 475/5 |
| 2015/0148178 A1 | | 5/2015 | Hwang et al. | |
| 2017/0122413 A1 | | 5/2017 | Tsao et al. | |
| 2017/0136870 A1 | | 5/2017 | Littlefield et al. | |
| 2017/0204942 A1 | | 7/2017 | Iuchi et al. | |

\* cited by examiner

| Speed | Clutch Operation | | Ratios | | |
|---|---|---|---|---|---|
| | C1 | C2 | First Stage | Second Stage | Transmission |
| 1 | ○ | ○ | 2.33 | 1.75 | 4.08 |
| 2 | ● | ● | 1.00 | 1.75 | 1.75 |

FIG. 2B

| Speed | Clutch Operation | | Ratios | | |
|---|---|---|---|---|---|
| | C1 | C2 | First Stage | Second Stage | Transmission |
| 1 | ○ | ○ | 2.33 | 2.33 | 5.44 |
| 2 | ● | ● | 1.00 | 2.33 | 2.33 |

FIG. 3B

| Speed | Clutch Operation | | Ratios | | |
|---|---|---|---|---|---|
| | C1 | C2 | First Stage | Second Stage | Transmission |
| 1 | ○ | ○ | 1.75 | 1.75 | 3.06 |
| 2 | ● | ● | 1.00 | 1.75 | 1.75 |

FIG. 4B

| Speed | Clutch Operation | | Ratios | | |
|---|---|---|---|---|---|
| | C1 | C2 | First Stage | Second Stage | Transmission |
| 1 | ○ | ○ | 1.75 | 2.33 | 4.08 |
| 2 | ● | ● | 1.00 | 2.33 | 2.33 |

FIG. 5B

MULTISPEED AUTOMATIC TRANSMISSION FOR ELECTRIFIED VEHICLES

TECHNICAL FIELD

The embodiments disclosed herein relate to vehicles and, more particularly, to vehicles that have electrified powertrains.

BACKGROUND

Many vehicles are electrified vehicles or, in other words, vehicles that have an electrified powertrain. The vehicles typically have more or less traditional drivetrains. Specifically, as part of the drivetrains, the vehicles include wheels, as well as differentials, drive shafts and the like connected to the wheels. However, in place of engines and transmissions, the vehicles include electric motors. And, as part of the powertrains, the electric motors are connected to the drivetrains. In conjunction with the drivetrains, the electric motors are operable to power the wheels.

Vehicle manufactures, among others, may desire to connect the electric motors to the drivetrains through transmissions. Relatedly, vehicle manufactures, among others, may desire multispeed automatic transmissions suited for the use of the electric motors to power the wheels through the transmissions.

SUMMARY

Disclosed herein are embodiments of a transmission that includes componentry for a two-speed automatic configuration, and a vehicle with a transmission that includes componentry for a two-speed automatic configuration through which an electric motor is connected to a drivetrain to power a wheel. In one aspect, a transmission includes a first planetary gear set and a second planetary gear set that are the only planetary gear sets interconnected from an input to an output. The first planetary gear set includes an input-only first input gear and a first non-input/output gear, a first pinion gear meshed therebetween, and a first output planetary carrier carrying the first pinion gear. The first output planetary carrier is alternatively output-only or output-and-input. Moreover, the first non-input/output gear is alternatively held when the first output planetary carrier is output-only or released when the first output planetary carrier is output-and-input. The second planetary gear set includes an input-only second input gear and a grounded second non-input/output gear, a second pinion gear meshed therebetween, and an output-only second output planetary carrier carrying the second pinion gear.

In another aspect, a vehicle includes a drivetrain with a wheel, an electric motor, and a transmission through which the electric motor is connected to the drivetrain to power the wheel. The transmission includes an input from which the electric motor is connected, and an output to which the drivetrain is connected. The transmission also includes an a first planetary gear set and a second planetary gear set that are each interconnected between the input and the output, and that are the only planetary gear sets interconnected from the input to the output. The first planetary gear set includes an input-only first input gear and a first non-input/output gear, a first pinion gear meshed therebetween, and a first output planetary carrier carrying the first pinion gear. The first output planetary carrier is alternatively output-only or output-and-input. Moreover, the first non-input/output gear is alternatively held when the first output planetary carrier is output-only or released when the first output planetary carrier is output-and-input. The second planetary gear set includes an input-only second input gear and a grounded second non-input/output gear, a second pinion gear meshed therebetween, and an output-only second output planetary carrier carrying the second pinion gear.

In yet another aspect, a transmission includes a rotary input, a rotary output, a first planetary gear set and a second planetary gear set. The first planetary gear set includes a rotary first input gear and a rotary first non-input/output gear, a first pinion gear meshed therebetween, and a rotary first output planetary carrier carrying the first pinion gear. The first input gear only shares an upstream rotary connection with the input. The second planetary gear set includes a rotary second input gear and a grounded second non-input/output gear, a second pinion gear meshed therebetween, and a rotary second output planetary carrier carrying the second pinion gear. The second input gear only shares an upstream rotary connection with the first output planetary carrier, and the second output planetary carrier only shares a downstream rotary connection with the output. The transmission also includes a rotary connecting clutch between the input and the first output planetary carrier, and a grounded holding clutch about the first non-input/output gear. By the operation of the connecting clutch and the holding clutch, the first output planetary carrier alternatively only shares a downstream rotary connection with the second input gear, in which case the first non-input/output gear is held, or shares a downstream rotary connection with the second input gear and shares an upstream rotary connection with the input, in which case the first non-input/output gear is released.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a representative electrified vehicle that includes a two-speed automatic transmission suited for the use of electric motors to power wheels through the transmission. The transmission has implementations in which two planetary gear sets are used to establish a total of two same-sign transmission ratios corresponding with two unidirectional speeds.

Semi-Tractor Electrified Vehicle

Figure 1:
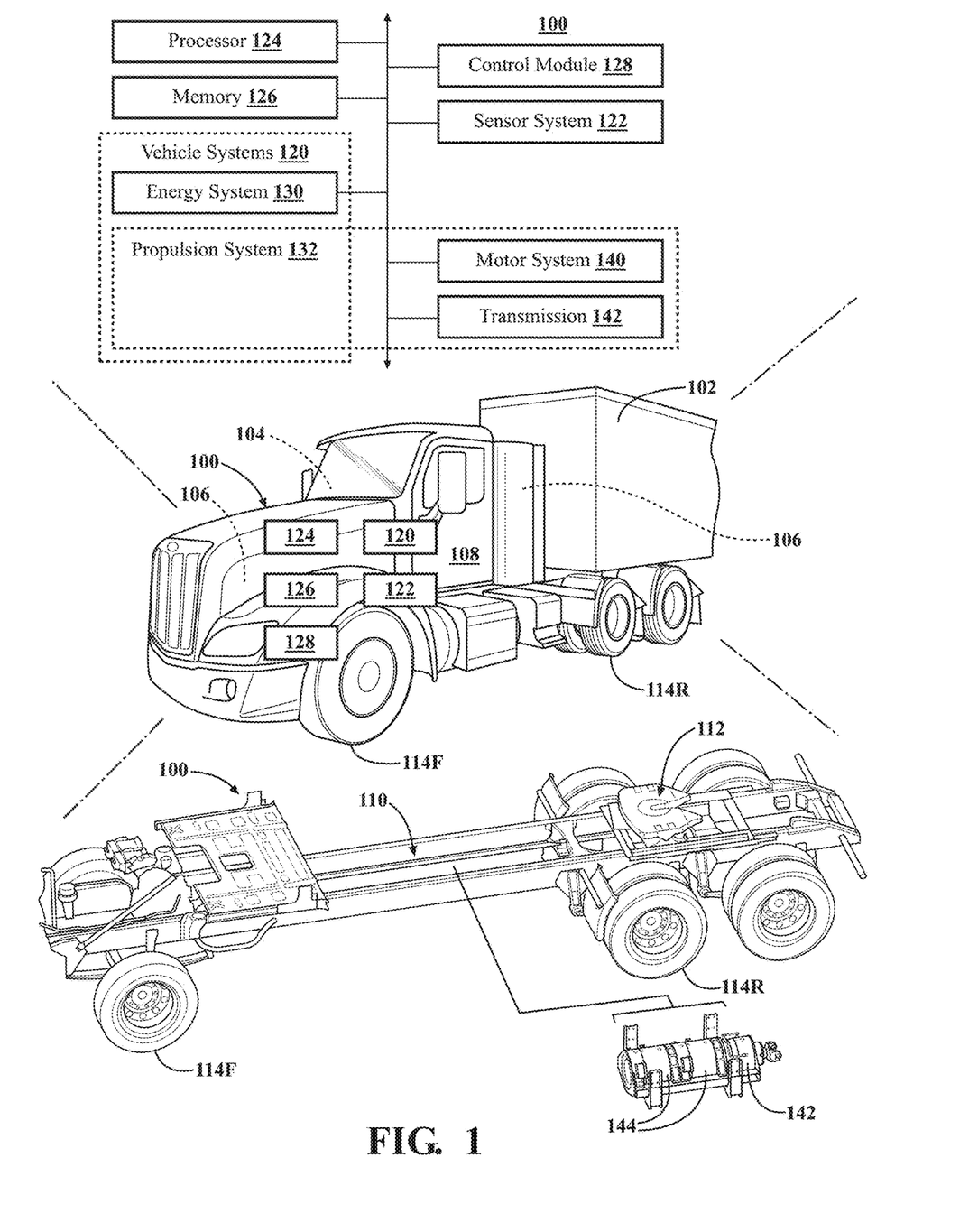
FIG. 1 is a portrayal of a vehicle using a block diagram and perspective views, showing a drivetrain with wheels, electric motors, and a multispeed automatic transmission through which the electric motors are connected to the drivetrain to power the wheels.

A representative electrified vehicle 100 is shown in FIG. 1. In this description, uses of "front," "forward" and the like, and uses of "rear," "rearward" and the like, refer to the longitudinal directions of the vehicle 100. "Front," "forward" and the like refer to the front (fore) of the vehicle 100, while "rear," "rearward" and the like refer to the back (aft) of the vehicle 100. Uses of "side," "sideways," "transverse" and the like refer to the lateral directions of the vehicle 100, with "driver's side" and the like referring to the left side of the vehicle 100, and "passenger side" and the like referring to the right side of the vehicle 100.

The vehicle 100 is a semi-tractor or, in other words, a tractor unit that, together with a hitched semitrailer 102, forms a semi-truck. The vehicle 100 has an exterior and a number of interior compartments. The compartments include a passenger compartment 104 and one or more engine compartments 106. The vehicle 100 may include, among other things, seats and a dash assembly housed in its passenger compartment 104.

The vehicle 100 has a body 108 that forms its exterior and defines its compartments. The body 108 has upright sides, a floor, a front end, a rear end, a roof and the like. In the semi-truck to which the vehicle 100 belongs, the semitrailer 102 similarly has an exterior and, as an interior compartment, a cargo compartment for carrying cargo. In addition to the body 108, the vehicle 100 has a chassis 110. The chassis 110 serves as an underbody for the vehicle 100. The chassis 110, like the body 108, forms the exterior of the vehicle 100. As part of the chassis 110, the vehicle 100 includes a hitch 112 for hitching the semitrailer 102 to the vehicle 100. With the semitrailer 102 hitched to the vehicle 100, the vehicle 100 is operable to pull the semitrailer 102 and any onboard cargo.

The vehicle 100 has a drivetrain. The drivetrain is part of, mounted to or otherwise supported by the chassis 110. The drivetrain may be housed, in whole or in part, in any combination of the passenger compartment 104, the engine compartments 106 or elsewhere in the vehicle 100. As part of the drivetrain, the vehicle 100 includes wheels 114. The wheels 114 support the remainder of the vehicle 100 on the ground. The vehicle 100 includes ten wheels 114, two of which are front wheels 114F, and eight of which are rear wheels 114R. The rear wheels 114R are arranged in four dual-wheel setups. The rear wheels 114R belonging to two driver's side dual-wheel setups are shown, with the other two, passenger side dual-wheel setups being mirror images that include the remaining rear wheels 114R. One, some or all of the wheels 114 are powered to drive the vehicle 100 along the ground. In a rear-wheel drive arrangement, one, some or all of the rear wheels 114R are powered to drive the vehicle 100 along the ground. For this purpose, also as part of the drivetrain, in addition to the wheels 114, the vehicle 100 includes any penultimate combination of a differential, a drive shaft and the like mechanically connected to the wheels 114.

The vehicle 100 operates as an assembly of interconnected items that equip the vehicle 100 to perform one or more vehicle functions. With respect to performing vehicle functions, the vehicle 100 is subject to any combination of manual operation and autonomous operation. In the case of manual operation, the vehicle 100 may be manual-only. In the case of autonomous operation, the vehicle 100 may be semi-autonomous, highly-autonomous or fully-autonomous.

For purposes of performing vehicle functions, the vehicle 100 includes one or more vehicle systems 120. Either alone or in conjunction with the drivetrain, the vehicle systems 120 are operable to perform vehicle functions on behalf of the vehicle 100. Any combination of the vehicle systems 120 may be operable to perform a vehicle function. Accordingly, from the perspective of a vehicle function, one, some or all of the vehicle systems 120 serve as associated vehicle systems 120. Moreover, each vehicle system 120 may be operable to perform any combination of vehicle functions, in whole or in part. Accordingly, each vehicle system 120, from its own perspective, serves as an associated vehicle system 120 for one or more vehicle functions.

In addition to the vehicle systems 120, the vehicle 100 includes a sensor system 122, as well as one or more processors 124, memory 126, and a control module 128 to which the vehicle systems 120 and the sensor system 122 are communicatively connected. The sensor system 122 is operable to detect information about the vehicle 100. The processors 124, the memory 126 and the control module 128 together serve as one or more computing devices whose control module 128 is employable to orchestrate the operation of the vehicle 100. Specifically, the control module 128 operates the vehicle systems 120 based on information about the vehicle 100. Accordingly, as a prerequisite to operating the vehicle systems 120, the control module 128 gathers information about the vehicle 100, including the information about the vehicle 100 detected by the sensor system 122. The control module 128 then evaluates the information about the vehicle 100, and operates the vehicle systems 120 based on its evaluation.

Vehicle Systems.

The vehicle systems 120 are part of, mounted to or otherwise supported by the chassis 110. The vehicle systems 120 may be housed, in whole or in part, in any combination of the passenger compartment 104, the engine compartments 106 or elsewhere in the vehicle 100. Each vehicle system 120 includes one or more vehicle elements. On behalf of the vehicle system 120 to which it belongs, each vehicle element is operable to perform, in whole or in part, any combination of vehicle functions with which the vehicle system 120 is associated. It will be understood that the vehicle elements, as well as the vehicle systems 120 to which they belong, may but need not be mutually distinct.

The vehicle systems 120 include an energy system 130 and a propulsion system 132. The energy system 130 and the propulsion system 132 are electrically connected to one another. Moreover, the propulsion system 132 and the drivetrain are mechanically connected to one another. The propulsion system 132 and the drivetrain together serve as an electrified powertrain for the vehicle 100. The energy system 130 is operable to perform one or more energy functions, including but not limited to generating electrical energy, as well as storing, conditioning and otherwise handling electrical energy. In conjunction with the drivetrain, the propulsion system 132 is operable to perform one or more propulsion functions using electrical energy from the energy system 130, including but not limited to powering the wheels 114. With the wheels 114 powered, the propulsion system 132 is employable to accelerate the vehicle 100, maintain the speed of the vehicle 100 (e.g., on level or uphill ground) and otherwise drive the vehicle 100 along the ground.

In addition to the energy system 130 and the propulsion system 132, the vehicle systems 120 may include one or more auxiliary systems, including a braking system, a steering system, an accessory system and the like. The auxiliary systems are electrically connected to the energy system 130. The auxiliary systems are operable to perform one or more auxiliary functions using electrical energy from the energy system 130, including but not limited to braking the vehicle 100, steering the vehicle 100 and one or more accessory functions.

In any combination of fuel cell, plug-in, range-extending, hybrid and like arrangements, the energy system 130 may include any combination of one or more fuel cells, one or more engines, one or more generators and like energy elements operable to generate electrical energy for use by the propulsion system 132 and the auxiliary systems. Alternatively, or additionally, the energy system 130 may include one or more batteries and like energy elements operable to store electrical energy for use by the propulsion system 132 and the auxiliary systems. In relation to these and other energy elements, the energy system 130 may include one or more handling units operable to condition and otherwise handle electrical energy therefrom, including but not limited to distributing electrical energy and conditioning electrical energy (e.g., converting DC electrical energy into three-phase AC electrical energy, converting a certain voltage DC electrical energy into a different voltage DC electrical energy, etc.).

The propulsion system 132 includes a motor system 140 and a multispeed automatic transmission 142. Among the propulsion elements of the motor system 140, the vehicle 100 includes one or more motors 144. Although the vehicle 100, as shown, includes two motors 144, it will be understood that this disclosure is applicable in principle to otherwise similar vehicles including one motor 144, as well as otherwise similar vehicles otherwise including multiple motors 144. The motors 144 are axially integrated for codependent spinning action. The motors 144 may, for example, be synchronous three-phase AC or other types of electric motors. In the drivetrain, any penultimate combination of the transmission 142, a drive shaft, a differential and the like are mechanically connected to the wheels 114. The motors 144 are electrically connected to the energy system 130. Moreover, the motors 144 are mechanically connected to the drivetrain through the transmission 142 as part of the electrified powertrain for the vehicle 100. With the motors 144 thus mechanically connected to the drivetrain, in conjunction with the drivetrain, the motors 144 are operable to power the wheels 114 through the transmission 142 using electrical energy from the energy system 130. The transmission 142 has multiple speeds and, in association with the motors 144 powering the wheels 114 therethrough, is operable to shift between the speeds.

Sensor System.

As part of the sensor system 122, the vehicle 100 includes one or more onboard sensors. The sensors monitor the vehicle 100 in real-time. The sensors, on behalf of the sensor system 122, are operable to detect information about the vehicle 100, including information about user requests and information about the operation of the vehicle 100.

The vehicle 100 includes user controls. The user controls serve as interfaces between users of the vehicle 100 and the vehicle 100 itself, and are operable to receive mechanical, verbal and other user inputs requesting vehicle functions. In conjunction with corresponding user controls, and among the sensors, the vehicle 100 includes an accelerator pedal sensor, a brake pedal sensor, a steering angle sensor and the like, and one or more selector sensors, one or more microphones, one or more cameras and the like. Relatedly, among information about user requests, the sensor system 122 is operable to detect user inputs requesting powering the wheels 114, and user inputs requesting braking, steering and the like.

Also among the sensors, the vehicle 100 includes one or more speedometers, one or more gyroscopes, one or more accelerometers, one or more inertial measurement units (IMUs), one or more wheel sensors, one or more transmission sensors, one or more controller area network (CAN) sensors and the like. Relatedly, among information about the operation of the vehicle 100, the sensor system 122 is operable to detect the location and motion of the vehicle 100, including its speed, acceleration, orientation, rotation, direction and the like, the movement of the wheels 114, the shifting of the transmission 142 between the speeds, and the operational statuses of one, some or all of the vehicle systems 120.

Control Module.

As noted above, the processors 124, the memory 126 and the control module 128 together serve as a computing device whose control module 128 orchestrates the operation of the vehicle 100, including but not limited to the operation of the vehicle systems 120. The control module 128 may be a global control module. Relatedly, as part of a central control system, the vehicle 100 may include a global control unit to which the control module 128 belongs. Although the vehicle 100, as shown, includes one control module 128, it will be understood that this disclosure is applicable in principle to otherwise similar vehicles including multiple control modules 128.

The processors 124 are any components configured to execute any of the processes described herein or any form of instructions to carry out such processes or cause such processes to be performed. The processors 124 may be implemented with one or more general purpose or special purpose processors. Examples of suitable processors 124 include microprocessors, microcontrollers, digital signal processors or other forms of circuitry that execute software. Other examples of suitable processors 124 include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry or controllers. The processors 124 may include at least one hardware circuit (e.g., an integrated circuit) configured to carry out instructions contained in program code. In arrangements where there are multiple processors 124, the processors 124 may work independently from each other or in combination with one another.

The memory 126 is a non-transitory computer readable medium. The memory 126 may include volatile or nonvolatile memory, or both. Examples of suitable memory 126 includes random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives or any other suitable storage medium, or any combination of these. The memory 126 includes stored instructions in program code. Such instructions are executable by the processors 124 or the control module 128. The memory 126 may be part of the processors 124 or the control module 128, or may be communicatively connected the processors 124 or the control module 128.

Generally speaking, the control module 128 includes instructions that may be executed by the processors 124. The control module 128 may be implemented as computer readable program code that, when executed by the processors 124, execute one or more of the processes described herein. Such computer readable program code may be stored on the memory 126. The control module 128 may be part of the processors 124, or may be communicatively connected the processors 124.

Transmission

Representative implementations of the transmission 142 are shown in FIGS. 2A, 3A, 4A and 5A. In each implementation thereof, the transmission 142 has a transmission axis A. The transmission axis A serves as a common axis of rotation for the transmission 142. Along the transmission axis A, the transmission 142 includes a leading shaft-like rotary input I, and a culminating shaft-like rotary output O in an axially spaced relationship with the input I. Moreover, the transmission 142 includes two intermediate planetary gear sets P in an axially spaced relationship with one another, and two intermediate clutches C about the planetary gear sets P.

As noted above, the transmission 142 has multiple speeds, and is operable to shift between the speeds. The speeds correspond to multiple transmission ratios or, in other words, numbers of input I revolutions for every output O revolution. In the transmission 142, the input I and the output O are axially aligned with one another along the transmission axis A for axial rotation at the transmission ratios. The planetary gear sets P are axially aligned with the input I, the output O and one another along the transmission axis A for multiple states of interconnected motion in which the planetary gear sets P establish the transmission ratios and transfer axial rotation of the input I into axial rotation of the output O at the transmission ratios. From their positions about the planetary gear sets P, the clutches C are operable to shift the transmission 142 between the speeds by switching the planetary gear sets P between the states of interconnected motion.

Each planetary gear set P includes an externally toothed sun gear S, a surrounding internally toothed ring gear R in a radially spaced relationship with the sun gear S, and one or more intermediate externally toothed pinion gears N. Moreover, each planetary gear set P includes a rotary planetary carrier X. The pinion gears N are meshed between the sun gear S and the ring gear R, and the planetary carrier X carries the pinion gears N for meshing between the sun gear S and the ring gear R. The sun gear S and the ring gear R are coaxially aligned with one another on the transmission axis A for any combination of axial rotation, holding against axial rotation, release for axial rotation, grounding and the like. From their positions between the sun gear S and the ring gear R, the pinion gears N are circumferentially spaced about the transmission axis A for planetary motion. From its position to carry the pinion gears N, the planetary carrier X is coaxially aligned with the sun gear S and the ring gear R on the transmission axis A for axial rotation common with the planetary motion of the pinion gears N.

In addition to the input I, the output O, the planetary gear sets P and the clutches C, the transmission 142 includes a surrounding housing H. Using the housing H, the transmission 142 houses the planetary gear sets P and the clutches C, and exposes the input I and the output O. Moreover, the transmission 142 supports the input I and the output O for axial rotation, supports the planetary gear sets P for interconnected motion, and supports the clutches C about the planetary gear sets P. Specifically, the transmission 142 supports the input I for powered axial rotation by the motors 144, supports the planetary gear sets P for powered interconnected motion by the input I, and supports the output O for powered axial rotation by the planetary gear sets P. Relatedly, the transmission 142 supports the clutches C about the planetary gear sets P for switching the planetary gear sets P between the states of interconnected motion.

One of the planetary gear sets P is a first planetary gear set P1, and the other of the planetary gear sets P is a second planetary gear set P2. The first planetary gear set P1 includes a first sun gear S1, a first ring gear R1, first pinion gears N1 and a first planetary carrier X1. The second planetary gear set P2 includes a second sun gear S2, a second ring gear R2, second pinion gears N2 and a second planetary carrier X2.

In each state of interconnected motion, the planetary gear sets P are interconnected from the input I to the output O. The input I, the first planetary gear set P1, the second planetary gear set P2 and the output O are part of a relationship in which the planetary gear sets P are the only planetary gear sets interconnected from the input I to the output O. Moreover, the input I is connected to the first planetary gear set P1, the first planetary gear set P1 is connected from the input I and to the second planetary gear set P2, the second planetary gear set P2 is connected from the first planetary gear set P1 and to the output O, and the output O is connected from the second planetary gear set P2, but the planetary gear sets P are not otherwise interconnected between the input I and the output O.

Specifically, from the input I to the output O, the input I, the first planetary gear set P1, the second planetary gear set P2 and the output O serially share rotary connections or, in other words, direct connections that establish common axial rotation therebetween. In relation thereto, in the first planetary gear set P1, between the first sun gear S1 and the first ring gear R1, the first planetary gear set P1 includes a rotary first input gear and a rotary first non-input/output gear. Moreover, the first planetary carrier X1 serves as a rotary first output planetary carrier X1. In the second planetary gear set P2, between the second sun gear S2 and the second ring gear R2, the second planetary gear set P2 includes a rotary second input gear and a grounded second non-input/output gear. Moreover, the second planetary carrier X2 serves as a rotary second output planetary carrier X2.

From the perspective of the first planetary gear set P1, the first input gear shares an upstream rotary connection with the input I. As shown, the first input gear may, for example, share a splined or otherwise permanent upstream rotary connection with the input I. Accordingly, the first planetary gear set P1 is connected from the input I at the first input gear. Moreover, the first output planetary carrier X1 shares a downstream rotary connection with the second planetary gear set P2. As shown, the first output planetary carrier X1 may, for example, share a splined or otherwise permanent downstream rotary connection with the second planetary gear set P2. Accordingly, the first planetary gear set P1 is connected to the second planetary gear set P2 at the first output planetary carrier X1.

From the perspective of the second planetary gear set P2, the second input gear shares an upstream rotary connection with the first planetary gear set P1. As shown, the second input gear may, for example, share a splined or otherwise permanent upstream rotary connection with the first planetary gear set P1. Accordingly, the second planetary gear set P2 is connected from the first planetary gear set P1 at the second input gear. Moreover, the second output planetary carrier X2 shares a downstream rotary connection with the output O. As shown, the second output planetary carrier X2 may, for example, share a splined or otherwise permanent downstream rotary connection with the output O. Accordingly, the second planetary gear set P2 is connected to the output O at the second output planetary carrier X2.

With the first input gear assuming axial rotation common with the input I, the first planetary gear set P1 transfers axial rotation of the first input gear into axial rotation of the first output planetary carrier X1. Moreover, with the second input gear assuming axial rotation common with the first output planetary carrier X1, the second planetary gear set P2 transfers axial rotation of the second input gear into axial rotation of the second output planetary carrier X2. With the output O assuming axial rotation common with the second output planetary carrier X2, the planetary gear sets P, with their interconnected motion, accordingly transfer axial rotation of the input I into axial rotation of the output O.

Relatedly, in each state of interconnected motion, the planetary gear sets P multiplicatively establish the transmission ratio at which they transfer axial rotation of the input I into axial rotation of the output O. Specifically, the first planetary gear set P1 has a first stage ratio or, in other words, number of first input gear revolutions for every first output planetary carrier X1 revolution. Similarly, the second planetary gear set P2 has a second stage ratio or, in other words, number of second input gear revolutions for every second output planetary carrier X2 revolution. The transmission ratio, in turn, is the multiplicative product of the first stage ratio and the second stage ratio.

To establish a total of two same-sign transmission ratios corresponding with two unidirectional speeds, the planetary gear sets P have two states of interconnected motion. In relation to the speeds, the transmission ratios and the states of interconnected motion, the first planetary gear set P1 has two same-sign first stage ratios, and the second planetary gear set P2 has one second stage ratio. Specifically, by the operation of the clutches C, the first planetary gear set P1 alternatively has a planetary first stage ratio or a relatively lower direct first stage ratio. Moreover, irrespective of the operation of the clutches C, the second planetary gear set P2 only has a planetary second stage ratio. Relatedly, the transmission 142 has a first speed corresponding to a first transmission ratio, and a second speed corresponding to a relatively lower second transmission ratio. In the first speed, to establish the first transmission ratio, the planetary gear sets P have a first state of interconnected motion in which the first planetary gear set P1 has the planetary first stage ratio and the second planetary gear set P2 has the planetary second stage ratio. In the second speed, to establish the second transmission ratio, the planetary gear sets P have a second state of interconnected motion, in which the first planetary gear set P1 has the direct first stage ratio and the second planetary gear set P2 has the planetary second stage ratio.

In relation to the first planetary gear set P1, and the planetary first stage ratio and the direct first stage ratio, one of the clutches C is a rotary connecting clutch C1 between the input I and the first output planetary carrier X1, and the other of the clutches C is a grounded holding clutch C2 about the first non-input/output gear. As shown, the connecting clutch C1 may, for example, be friction-type. In a normally-disengaged configuration, from its position between the input I and the first output planetary carrier X1, the connecting clutch C1 is left to disengage from between the input I and the first output planetary carrier X1, whereby the first output planetary carrier X1 does not share an upstream rotary connection with the input I. Alternatively, the connecting clutch C1 is operable to engage between the input I and the first output planetary carrier X1, whereby the first output planetary carrier X1 shares a clutched upstream rotary connection with the input I. As shown, the holding clutch C2 may, for example, be one-way-type. In a normally-engaged configuration, from its position about the first non-input/output gear, the holding clutch C2 is left to engage between the housing H and the first non-input/output gear, whereby the first non-input/output gear is held against axial rotation. Alternatively, the holding clutch C2 is operable to disengage from between the housing H and the first non-input/output gear, whereby the first non-input/output gear is released for axial rotation.

In the first planetary gear set P1, in relation to sharing an upstream rotary connection with the input I, the first input gear is input-only. Specifically, the first input gear only shares an upstream rotary connection with the input I and, equally, does not share a downstream rotary connection with the second planetary gear set P2. In relation to sharing a downstream rotary connection with the second planetary gear set P2, by the operation of the connecting clutch C1, the first output planetary carrier X1 is alternatively output-only or output-and-input. Specifically, when the connecting clutch C1 is left to disengage from between the input I and the first output planetary carrier X1, the first output planetary carrier X1 only shares a downstream rotary connection with the second planetary gear set P2 and, equally, does not share an upstream rotary connection with the input I. Alternatively, when the connecting clutch C1 is operated to engage between the input I and the first output planetary carrier X1, the first output planetary carrier X1 shares a downstream rotary connection with the second planetary gear set P2 and, at the same time, shares an upstream rotary connection with the input I.

The first non-input/output gear does not share either an upstream rotary connection with the input I or a downstream rotary connection with the second planetary gear set P2. However, in relation to the first input gear and the first output planetary carrier X1 sharing such rotary connections, by the operation of the holding clutch C2, the first non-input/output gear is alternatively held against axial rotation when the first output planetary carrier X1 is output-only or released for axial rotation when the first output planetary carrier X1 is output-and-input. Specifically, when, in association with leaving the connecting clutch C1 to disengage from between the input I and the first output planetary carrier X1, the holding clutch C2 is left to engage between the housing H and the first non-input/output gear, the first non-input/output gear is held against axial rotation. Alternatively, when, in association with operating the connecting clutch C1 to engage between the input I and the first output planetary carrier X1, the holding clutch C2 is operated to disengage from between the housing H and the first non-input/output gear, the first non-input/output gear is released for axial rotation.

In the second planetary gear set P2, in relation to sharing an upstream rotary connection with the first planetary gear set P1, the second input gear is input-only. Specifically, the second input gear only shares an upstream rotary connection with the first planetary gear set P1 and, equally, does not share a downstream rotary connection with the output O. In relation to sharing a downstream rotary connection with the output O, the second output planetary carrier X2 is output-only. Specifically, the second output planetary carrier X2 only shares a downstream rotary connection with the output O and, equally, does not share an upstream rotary connection with the first planetary gear set P1.

The second non-input/output gear does not share either an upstream rotary connection with the first planetary gear set P1 or a downstream rotary connection with the output O. However, in relation to the second input gear and the second output planetary carrier X2 sharing such rotary connections, the second non-input/output gear is grounded against axial rotation.

The transmission 142 is operable to shift between the speeds by the operation of the connecting clutch C1 and the holding clutch C2. In the first speed, the planetary gear sets P have the first state of interconnected motion in which the first planetary gear set P1 has the planetary first stage ratio when, by the operation of the connecting clutch C1 and the holding clutch C2, the first output planetary carrier X1 is output-only and the first non-input/output gear is held against axial rotation. Specifically, the control module 128 leaves the connecting clutch C1 to disengage from between the input I and the first output planetary carrier X1, and leaves the holding clutch C2 to engage between the housing H and the first non-input/output gear. As the first input gear assumes axial rotation common with the input I, with the first non-input/output gear held against axial rotation, the first pinion gears N1 mesh between the first input gear and the first non-input/output gear to assume planetary motion. In association therewith, with the first output planetary carrier X1 not sharing an upstream rotary connection with the input I, the first output planetary carrier X1 assumes axial rotation common with the planetary motion of the first pinion gears N1. As a result, the first planetary gear set P1 transfers axial rotation of the input I into axial rotation of the first output planetary carrier X1 at the planetary first stage ratio.

In the second speed, the planetary gear sets P have the second state of interconnected motion in which the first planetary gear set P1 has the direct first stage ratio when, by the operation of the connecting clutch C1 and the holding clutch C2, the first output planetary carrier X1 is output-and-input and the first non-input/output gear is released for axial rotation. Specifically, the control module 128 operates the connecting clutch C1 to engage between the input I and the first output planetary carrier X1, and operates the holding clutch C2 to disengage from between the housing H and the first non-input/output gear. With the first output planetary carrier X1 sharing an upstream rotary connection with the input I, both the first input gear and the first output planetary carrier X1 assume axial rotation common with the input I. In association therewith, with the first non-input/output gear released for axial rotation, the first pinion gears N1 lock between the first input gear and the first non-input/output gear and assume planetary motion common with the axial rotation of the first output planetary carrier X1, and the first non-input/output gear assumes axial rotation common with the planetary motion of the first pinion gears N1. As a result, the first planetary gear set P1 transfers axial rotation of the input I into axial rotation of the first output planetary carrier X1 at the direct first stage ratio.

In each speed, and as a feature of each state of interconnected motion, the second planetary gear set P2, with the second output planetary carrier X2 being output-only and the second non-input/output gear being grounded against axial rotation, has the planetary second stage ratio. Specifically, as the second input gear assumes axial rotation common with the first output planetary carrier X1, with the second non-input/output gear grounded against axial rotation, the second pinion gears N2 mesh between the second input gear and the second non-input/output gear to assume planetary motion. In association therewith, with the second output planetary carrier X2 not sharing an upstream rotary connection with the first planetary gear set P1, the second output planetary carrier X2 assumes axial rotation common with the planetary motion of the second pinion gears N2. As a result, the second planetary gear set P2 transfers axial rotation of the first output planetary carrier X1 into axial rotation of the second output planetary carrier X2 at the planetary second stage ratio.

In the first planetary gear set P1, according to known relationships therebetween, the planetary first stage ratio is established by the number of teeth the first input gear has and the number of teeth the first non-input/output gear has. For instance, the first sun gear S1 may have forty-five teeth, and the first ring gear R1 may have sixty teeth. In this and other implementations in which the first sun gear S1 has three teeth for every four teeth the first ring gear R1 has, the first planetary gear set P1 may have an approximately 1.75 to 2.33 planetary first stage ratio. Likewise, in the second planetary gear set P2, according to known relationships therebetween, the planetary second stage ratio is established by the number of teeth the second input gear has and the number of teeth the second non-input/output gear has. For instance, the second sun gear S2 may have forty-five teeth, and the second ring gear R2 may have sixty teeth. In this and other implementations in which the second sun gear S2 has three teeth for every four teeth the second ring gear R2 has, the second planetary gear set P2 may have an approximately 1.75 to 2.33 planetary second stage ratio. By extension, the transmission 142 may have an approximately 3.06 to 5.44 first transmission ratio corresponding with the first speed, and an approximately 1.75 to 2.33 second transmission ratio corresponding with the second speed.

Operating the Propulsion System

The vehicle 100 is equipped, in operation, to perform vehicle functions on behalf of the vehicle 100, and thereby satisfy corresponding vehicle demands on behalf of the vehicle 100. Among other things, given a propulsion demand, the propulsion system 132 is operable to satisfy the propulsion demand. For instance, given a demand to power the wheels 114, the propulsion system 132 is operable to satisfy the demand to power the wheels 114. Specifically, the motors 144 are operable to power the wheels 114 through the transmission 142 and, in association with the operation of the motors 144 to power the wheels 114 therethrough, the transmission 142 is operable to shift between the speeds.

As part of operating the vehicle 100 under the orchestration thereof, the control module 128 gathers information about the vehicle 100, including user inputs requesting powering the wheels 114, information about the operation of the vehicle 100 and other information about the vehicle 100 detected by the sensor system 122. As part of its evaluation of the information about the vehicle 100, the control module 128 monitors for and identifies one or more demands to power the wheels 114, as well as one or more driving situations. When the control module 128 identifies a demand to power the wheels 114, based on the current driving situation, the control module 128 operates the transmission 142 to shift between the speeds in association with operating the motors 144 to power the wheels 114 through the transmission 142.

It is contemplated that using the two planetary gear sets P to establish the total of two same-sign transmission ratios corresponding with the two unidirectional speeds equips the propulsion system 132 to efficiently satisfy demands to power the wheels 114 across a range of different driving situations while minimizing the size, complexity, cost and the like of the transmission 142.

For instance, in any combination of launch, low speed, high acceleration, high torque demand and like driving situations, the transmission 142 is operable to shift to the first speed in association with the motors 144 efficiently operating with any combination of low speed and high torque to power the wheels 114 through the transmission 142. Moreover, in any combination of cruising, high speed, low acceleration, low torque demand and like driving situations, the transmission 142 is operable to shift to the second speed in association with the motors 144 efficiently operating with any combination of high speed and low torque to power the wheels 114 through the transmission 142. Moreover, in reverse driving situations, rather than the transmission 142 having another dedicated transmission ratio corresponding with another dedicated speed therefor, and the planetary gear sets P having another dedicated state of interconnected motion to establish the other transmission ratio, the transmission 142 is operable to shift to the first speed in association with the motors 144 operating in reverse to power the wheels 114 through the transmission 142.

Transmission Implementations

Figure 2A:
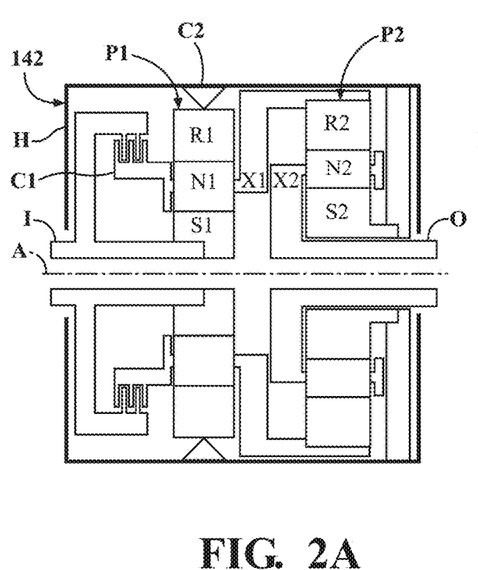
FIGS. 2A, 3A, 4A and 5A are schematic views of representative implementations of the transmission that include componentry for a two-speed automatic configuration, each showing an input, an output, planetary gear sets for transferring axial rotation of the input into axial rotation of the output, and clutches for shifting the transmission between the speeds.
Figure 2B:
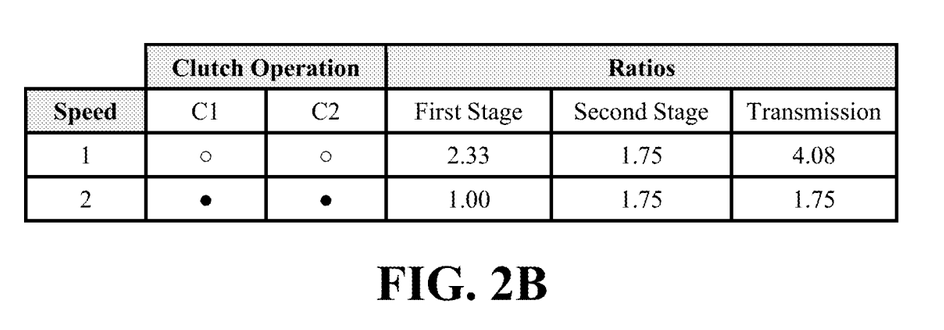
FIGS. 2B, 3B, 4B and 5B are operational charts for the representative implementations of the transmission in FIGS. 2A, 3A, 4A and 5A, respectively, each showing aspects of the transmission shifting between the speeds using the clutches.

As shown in FIG. 2A with additional reference to FIG. 2B, for example, in the first planetary gear set P1, the first input gear may be the first sun gear S1, and the first non-input/output gear may be the first ring gear R1. Moreover, in the second planetary gear set P2, the second input gear may be the second ring gear R2, and the second non-input/output gear may be the second sun gear S2.

The transmission 142 is operable to shift between the speeds by the operation of the connecting clutch C1 and the holding clutch C2. In the first speed, the planetary gear sets P have the first state of interconnected motion in which the first planetary gear set P1 has the planetary first stage ratio when, by the operation of the connecting clutch C1 and the holding clutch C2, the first output planetary carrier X1 is output-only and the first non-input/output ring gear R1 is held against axial rotation. Specifically, the control module 128 leaves the connecting clutch C1 to disengage from between the input I and the first output planetary carrier X1, and leaves the holding clutch C2 to engage between the housing H and the first non-input/output ring gear R1. As the first input sun gear S1 assumes axial rotation common with the input I, with the first non-input/output ring gear R1 held against axial rotation, the first pinion gears N1 mesh between the first input sun gear S1 and the first non-input/output ring gear R1 to assume planetary motion. In association therewith, with the first output planetary carrier X1 not sharing an upstream rotary connection with the input I, the first output planetary carrier X1 assumes axial rotation common with the planetary motion of the first pinion gears N1. As a result, the first planetary gear set P1 transfers axial rotation of the input I into axial rotation of the first output planetary carrier X1 at the planetary first stage ratio.

In the second speed, the planetary gear sets P have the second state of interconnected motion in which the first planetary gear set P1 has the direct first stage ratio when, by the operation of the connecting clutch C1 and the holding clutch C2, the first output planetary carrier X1 is output-and-input and the first non-input/output ring gear R1 is released for axial rotation. Specifically, the control module 128 operates the connecting clutch C1 to engage between the input I and the first output planetary carrier X1, and operates the holding clutch C2 to disengage from between the housing H and the first non-input/output ring gear R1. With the first output planetary carrier X1 sharing an upstream rotary connection with the input I, both the first input sun gear S1 and the first output planetary carrier X1 assume axial rotation common with the input I. In association therewith, with the first non-input/output ring gear R1 released for axial rotation, the first pinion gears N1 lock between the first input sun gear S1 and the first non-input/output ring gear R1 and assume planetary motion common with the axial rotation of the first output planetary carrier X1, and the first non-input/output ring gear R1 assumes axial rotation common with the planetary motion of the first pinion gears N1. As a result, the first planetary gear set P1 transfers axial rotation of the input I into axial rotation of the first output planetary carrier X1 at the direct first stage ratio.

In each speed, and as a feature of each state of interconnected motion, the second planetary gear set P2, with the second output planetary carrier X2 being output-only and the second non-input/output sun gear S2 being grounded against axial rotation, has the planetary second stage ratio. Specifically, as the second input ring gear R2 assumes axial rotation common with the first output planetary carrier X1, with the second non-input/output sun gear S2 grounded against axial rotation, the second pinion gears N2 mesh between the second input ring gear R2 and the second non-input/output sun gear S2 to assume planetary motion. In association therewith, with the second output planetary carrier X2 not sharing an upstream rotary connection with the first planetary gear set P1, the second output planetary carrier X2 assumes axial rotation common with the planetary motion of the second pinion gears N2. As a result, the second planetary gear set P2 transfers axial rotation of the first output planetary carrier X1 into axial rotation of the second output planetary carrier X2 at the planetary second stage ratio.

In the first planetary gear set P1, according to known relationships therebetween, the planetary first stage ratio is established by the number of teeth, $N_{S1}$, the first input sun gear S1 has, and the number of teeth, $N_{R1}$, the first non-input/output ring gear R1 has. For instance, the first input sun gear S1 may have forty-five teeth, and the first non-input/output ring gear R1 may have sixty teeth. In this and other implementations in which the first input sun gear S1 has three teeth for every four teeth the first non-input/output ring gear R1 has, according to the relationship $1+N_{R1}/N_{S1}$, the first planetary gear set P1 may have an approximately 2.33 planetary first stage ratio. Likewise, in the second planetary gear set P2, according to known relationships therebetween, the planetary second stage ratio is established by the number of teeth, $N_{R2}$, the second input ring gear R2 has, and the number of teeth, $N_{S2}$, the second non-input/output sun gear S2 has. For instance, the second non-input/output sun gear S2 may have forty-five teeth, and the second input ring gear R2 may have sixty teeth. In this and other implementations in which the second non-input/output sun gear S2 has three teeth for every four teeth the second input ring gear R2 has, according to the relationship $1+N_{S2}/N_{R2}$, the second planetary gear set P2 may have an approximately 1.75 planetary second stage ratio. By extension, the transmission 142 may have an approximately 4.08 first transmission ratio corresponding with the first speed, and an approximately 1.75 second transmission ratio corresponding with the second speed.

Figure 3A:
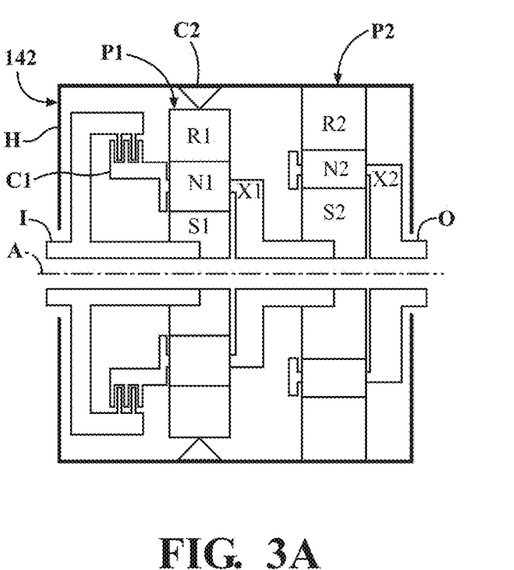
Figure 3B:
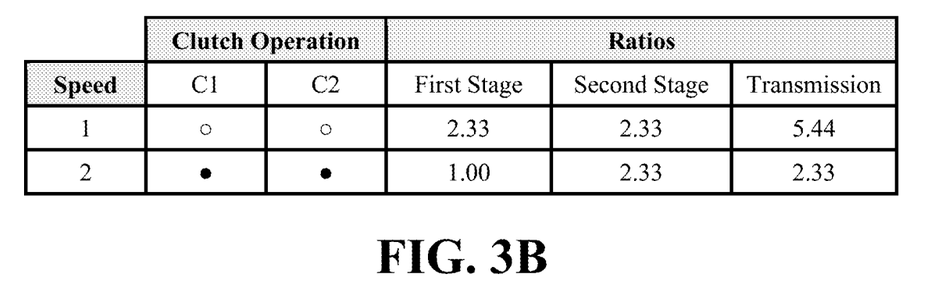

As shown in FIG. 3A with additional reference to FIG. 3B, for example, in the first planetary gear set P1, the first input gear may be the first sun gear S1, and the first non-input/output gear may be the first ring gear R1. Moreover, in the second planetary gear set P2, the second input gear may be the second sun gear S2, and the second non-input/output gear may be the second ring gear R2.

The transmission 142 is operable to shift between the speeds by the operation of the connecting clutch C1 and the holding clutch C2. In the first speed, the planetary gear sets P have the first state of interconnected motion in which the first planetary gear set P1 has the planetary first stage ratio when, by the operation of the connecting clutch C1 and the holding clutch C2, the first output planetary carrier X1 is output-only and the first non-input/output ring gear R1 is held against axial rotation. Specifically, the control module 128 leaves the connecting clutch C1 to disengage from between the input I and the first output planetary carrier X1, and leaves the holding clutch C2 to engage between the housing H and the first non-input/output ring gear R1. As the first input sun gear S1 assumes axial rotation common with the input I, with the first non-input/output ring gear R1 held against axial rotation, the first pinion gears N1 mesh between the first input sun gear S1 and the first non-input/output ring gear R1 to assume planetary motion. In association therewith, with the first output planetary carrier X1 not sharing an upstream rotary connection with the input I, the first output planetary carrier X1 assumes axial rotation common with the planetary motion of the first pinion gears N1. As a result, the first planetary gear set P1 transfers axial rotation of the input I into axial rotation of the first output planetary carrier X1 at the planetary first stage ratio.

In the second speed, the planetary gear sets P have the second state of interconnected motion in which the first planetary gear set P1 has the direct first stage ratio when, by the operation of the connecting clutch C1 and the holding clutch C2, the first output planetary carrier X1 is output-and-input and the first non-input/output ring gear R1 is released for axial rotation. Specifically, the control module 128 operates the connecting clutch C1 to engage between the input I and the first output planetary carrier X1, and operates the holding clutch C2 to disengage from between the housing H and the first non-input/output ring gear R1. With the first output planetary carrier X1 sharing an upstream rotary connection with the input I, both the first input sun gear S1 and the first output planetary carrier X1 assume axial rotation common with the input I. In association therewith, with the first non-input/output ring gear R1 released for axial rotation, the first pinion gears N1 lock between the first input sun gear S1 and the first non-input/output ring gear R1 and assume planetary motion common with the axial rotation of the first output planetary carrier X1, and the first non-input/output ring gear R1 assumes axial rotation common with the planetary motion of the first pinion gears N1. As a result, the first planetary gear set P1 transfers axial rotation of the input I into axial rotation of the first output planetary carrier X1 at the direct first stage ratio.

In each speed, and as a feature of each state of interconnected motion, the second planetary gear set P2, with the second output planetary carrier X2 being output-only and the second non-input/output ring gear R2 being grounded against axial rotation, has the planetary second stage ratio. Specifically, as the second input sun gear S2 assumes axial rotation common with the first output planetary carrier X1, with the second non-input/output ring gear R2 grounded against axial rotation, the second pinion gears N2 mesh between the second input sun gear S2 and the second non-input/output ring gear R2 to assume planetary motion. In association therewith, with the second output planetary carrier X2 not sharing an upstream rotary connection with the first planetary gear set P1, the second output planetary carrier X2 assumes axial rotation common with the planetary motion of the second pinion gears N2. As a result, the second planetary gear set P2 transfers axial rotation of the first output planetary carrier X1 into axial rotation of the second output planetary carrier X2 at the planetary second stage ratio.

In the first planetary gear set P1, according to known relationships therebetween, the planetary first stage ratio is established by the number of teeth, $N_{S1}$, the first input sun gear S1 has, and the number of teeth, $N_{R1}$, the first non-input/output ring gear R1 has. For instance, the first input sun gear S1 may have forty-five teeth, and the first non-input/output ring gear R1 may have sixty teeth. In this and other implementations in which the first input sun gear S1 has three teeth for every four teeth the first non-input/output ring gear R1 has, according to the relationship $1+N_{R1}/N_{S1}$, the first planetary gear set P1 may have an approximately 2.33 planetary first stage ratio. Likewise, in the second planetary gear set P2, according to known relationships therebetween, the planetary second stage ratio is established by the number of teeth, $N_{S2}$, the second input sun gear S2 has, and the number of teeth, $N_{R2}$, the second non-input/output ring gear R2 has. For instance, the second input sun gear S2 may have forty-five teeth, and the second non-input/output ring gear R2 may have sixty teeth. In this and other implementations in which the second input sun gear S2 has three teeth for every four teeth the second non-input/output ring gear R2 has, according to the relationship $1+N_{R2}/N_{S2}$, the second planetary gear set P2 may have an approximately 2.33 planetary second stage ratio. By extension, the transmission 142 may have an approximately 5.44 first transmission ratio corresponding with the first speed, and an approximately 2.33 second transmission ratio corresponding with the second speed.

Figure 4A:
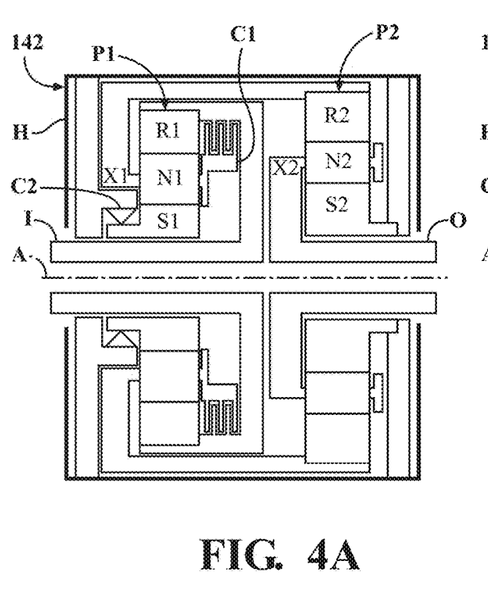
Figure 4B:
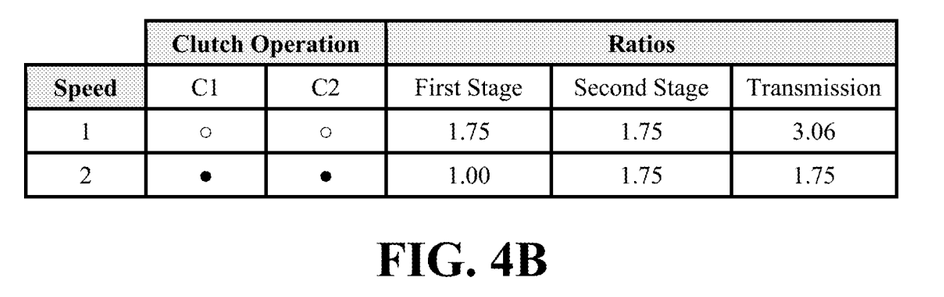

As shown in FIG. 4A with additional reference to FIG. 4B, for example, in the first planetary gear set P1, the first input gear may be the first ring gear R1, and the first non-input/output gear may be the first sun gear S1. Moreover, in the second planetary gear set P2, the second input gear may be the second ring gear R2, and the second non-input/output gear may be the second sun gear S2.

The transmission 142 is operable to shift between the speeds by the operation of the connecting clutch C1 and the holding clutch C2. In the first speed, the planetary gear sets P have the first state of interconnected motion in which the first planetary gear set P1 has the planetary first stage ratio when, by the operation of the connecting clutch C1 and the holding clutch C2, the first output planetary carrier X1 is output-only and the first non-input/output sun gear S1 is held against axial rotation. Specifically, the control module 128 leaves the connecting clutch C1 to disengage from between the input I and the first output planetary carrier X1, and leaves the holding clutch C2 to engage between the housing H and the first non-input/output sun gear S1. As the first input ring gear R1 assumes axial rotation common with the input I, with the first non-input/output sun gear S1 held against axial rotation, the first pinion gears N1 mesh between the first input ring gear R1 and the first non-input/output sun gear S1 to assume planetary motion. In association therewith, with the first output planetary carrier X1 not sharing an upstream rotary connection with the input I, the first output planetary carrier X1 assumes axial rotation common with the planetary motion of the first pinion gears N1. As a result, the first planetary gear set P1 transfers axial rotation of the input I into axial rotation of the first output planetary carrier X1 at the planetary first stage ratio.

In the second speed, the planetary gear sets P have the second state of interconnected motion in which the first planetary gear set P1 has the direct first stage ratio when, by the operation of the connecting clutch C1 and the holding clutch C2, the first output planetary carrier X1 is output-and-input and the first non-input/output sun gear S1 is released for axial rotation. Specifically, the control module 128 operates the connecting clutch C1 to engage between the input I and the first output planetary carrier X1, and operates the holding clutch C2 to disengage from between the housing H and the first non-input/output sun gear S1. With the first output planetary carrier X1 sharing an upstream rotary connection with the input I, both the first input ring gear R1 and the first output planetary carrier X1 assume axial rotation common with the input I. In association therewith, with the first non-input/output sun gear S1 released for axial rotation, the first pinion gears N1 lock between the first input ring gear R1 and the first non-input/output sun gear S1 and assume planetary motion common with the axial rotation of the first output planetary carrier X1, and the first non-input/output sun gear S1 assumes axial rotation common with the planetary motion of the first pinion gears N1. As a result, the first planetary gear set P1 transfers axial rotation of the input I into axial rotation of the first output planetary carrier X1 at the direct first stage ratio.

In each speed, and as a feature of each state of interconnected motion, the second planetary gear set P2, with the second output planetary carrier X2 being output-only and the second non-input/output sun gear S2 being grounded against axial rotation, has the planetary second stage ratio. Specifically, as the second input ring gear R2 assumes axial rotation common with the first output planetary carrier X1, with the second non-input/output sun gear S2 grounded against axial rotation, the second pinion gears N2 mesh between the second input ring gear R2 and the second non-input/output sun gear S2 to assume planetary motion. In association therewith, with the second output planetary carrier X2 not sharing an upstream rotary connection with the first planetary gear set P1, the second output planetary carrier X2 assumes axial rotation common with the planetary motion of the second pinion gears N2. As a result, the second planetary gear set P2 transfers axial rotation of the first output planetary carrier X1 into axial rotation of the second output planetary carrier X2 at the planetary second stage ratio.

In the first planetary gear set P1, according to known relationships therebetween, the planetary first stage ratio is established by the number of teeth, $N_{R1}$, the first input ring gear R1 has, and the number of teeth, $N_{S1}$, the first non-input/output sun gear S1 has. For instance, the first non-input/output sun gear S1 may have forty-five teeth, and the first input ring gear R1 may have sixty teeth. In this and other implementations in which the first non-input/output sun gear S1 has three teeth for every four teeth the first input ring gear R1 has, according to the relationship $1+N_{S1}/N_{R1}$, the first planetary gear set P1 may have an approximately 1.75 planetary first stage ratio. Likewise, in the second planetary gear set P2, according to known relationships therebetween, the planetary second stage ratio is established by the number of teeth, $N_{R2}$, the second input ring gear R2 has, and the number of teeth, $N_{S2}$, the second non-input/output sun gear S2 has. For instance, the second non-input/output sun gear S2 may have forty-five teeth, and the second input ring gear R2 may have sixty teeth. In this and other implementations in which the second non-input/output sun gear S2 has three teeth for every four teeth the second input ring gear R2 has, according to the relationship $1+N_{S2}/N_{R2}$, the second planetary gear set P2 may have an approximately 1.75 planetary second stage ratio. By extension, the transmission 142 may have an approximately 3.06 first transmission ratio corresponding with the first speed, and an approximately 1.75 second transmission ratio corresponding with the second speed.

Figure 5A:
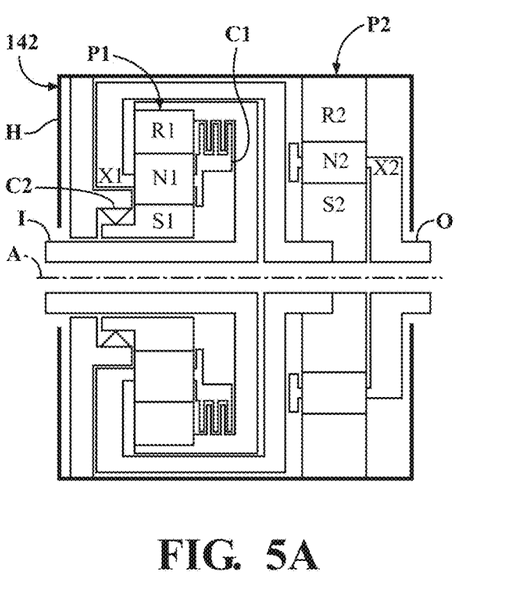
Figure 5B:
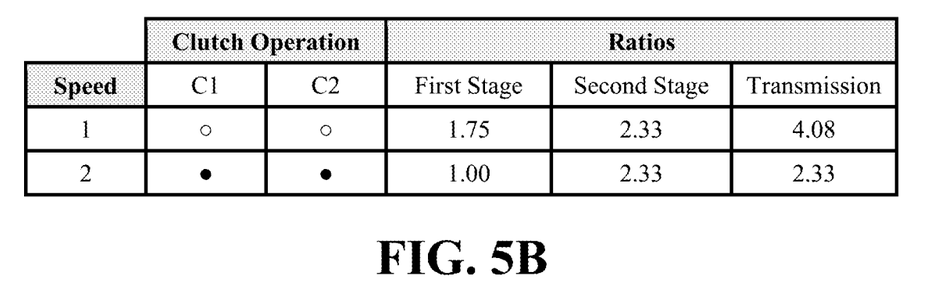

As shown in FIG. 5A with additional reference to FIG. 5B, for example, in the first planetary gear set P1, the first input gear may be the first ring gear R1, and the first non-input/output gear may be the first sun gear S1. Moreover, in the second planetary gear set P2, the second input gear may be the second sun gear S2, and the second non-input/output gear may be the second ring gear R2.

The transmission 142 is operable to shift between the speeds by the operation of the connecting clutch C1 and the holding clutch C2. In the first speed, the planetary gear sets P have the first state of interconnected motion in which the first planetary gear set P1 has the planetary first stage ratio when, by the operation of the connecting clutch C1 and the holding clutch C2, the first output planetary carrier X1 is output-only and the first non-input/output sun gear S1 is held against axial rotation. Specifically, the control module 128 leaves the connecting clutch C1 to disengage from between the input I and the first output planetary carrier X1, and leaves the holding clutch C2 to engage between the housing H and the first non-input/output sun gear S1. As the first input ring gear R1 assumes axial rotation common with the input I, with the first non-input/output sun gear S1 held against axial rotation, the first pinion gears N1 mesh between the first input ring gear R1 and the first non-input/output sun gear S1 to assume planetary motion. In association therewith, with the first output planetary carrier X1 not sharing an upstream rotary connection with the input I, the first output planetary carrier X1 assumes axial rotation common with the planetary motion of the first pinion gears N1. As a result, the first planetary gear set P1 transfers axial rotation of the input I into axial rotation of the first output planetary carrier X1 at the planetary first stage ratio.

In the second speed, the planetary gear sets P have the second state of interconnected motion in which the first planetary gear set P1 has the direct first stage ratio when, by the operation of the connecting clutch C1 and the holding clutch C2, the first output planetary carrier X1 is output-and-input and the first non-input/output sun gear S1 is released for axial rotation. Specifically, the control module 128 operates the connecting clutch C1 to engage between the input I and the first output planetary carrier X1, and operates the holding clutch C2 to disengage from between the housing H and the first non-input/output sun gear S1. With the first output planetary carrier X1 sharing an upstream rotary connection with the input I, both the first input ring gear R1 and the first output planetary carrier X1 assume axial rotation common with the input I. In association therewith, with the first non-input/output sun gear S1 released for axial rotation, the first pinion gears N1 lock between the first input ring gear R1 and the first non-input/output sun gear S1 and assume planetary motion common with the axial rotation of the first output planetary carrier X1, and the first non-input/output sun gear S1 assumes axial rotation common with the planetary motion of the first pinion gears N1. As a result, the first planetary gear set P1 transfers axial rotation of the input I into axial rotation of the first output planetary carrier X1 at the direct first stage ratio.

In each speed, and as a feature of each state of interconnected motion, the second planetary gear set P2, with the second output planetary carrier X2 being output-only and the second non-input/output ring gear R2 being grounded against axial rotation, has the planetary second stage ratio. Specifically, as the second input sun gear S2 assumes axial rotation common with the first output planetary carrier X1, with the second non-input/output ring gear R2 grounded against axial rotation, the second pinion gears N2 mesh between the second input sun gear S2 and the second non-input/output ring gear R2 to assume planetary motion. In association therewith, with the second output planetary carrier X2 not sharing an upstream rotary connection with the first planetary gear set P1, the second output planetary carrier X2 assumes axial rotation common with the planetary motion of the second pinion gears N2. As a result, the second planetary gear set P2 transfers axial rotation of the first output planetary carrier X1 into axial rotation of the second output planetary carrier X2 at the planetary second stage ratio.

In the first planetary gear set P1, according to known relationships therebetween, the planetary first stage ratio is established by the number of teeth, $N_{R1}$, the first input ring gear R1 has, and the number of teeth, $N_{S1}$, the first non-input/output sun gear S1 has. For instance, the first non-input/output sun gear S1 may have forty-five teeth, and the first input ring gear R1 may have sixty teeth. In this and other implementations in which the first non-input/output sun gear S1 has three teeth for every four teeth the first input ring gear R1 has, according to the relationship $1+N_{S1}/N_{R1}$, the first planetary gear set P1 may have an approximately 1.75 planetary first stage ratio. Likewise, in the second planetary gear set P2, according to known relationships therebetween, the planetary second stage ratio is established by the number of teeth, $N_{S2}$, the second input sun gear S2 has, and the number of teeth, $N_{R2}$, the second non-input/output ring gear R2 has. For instance, the second input sun gear S2 may have forty-five teeth, and the second non-input/output ring gear R2 may have sixty teeth. In this and other implementations in which the second input sun gear S2 has three teeth for every four teeth the second non-input/output ring gear R2 has, according to the relationship $1+N_{R2}/N_{S2}$, the second planetary gear set P2 may have an approximately 2.33 planetary second stage ratio. By extension, the transmission 142 may have an approximately 4.08 first transmission ratio corresponding with the first speed, and an approximately 2.33 second transmission ratio corresponding with the second speed.

While recited characteristics and conditions of the invention have been described in connection with certain embodiments, it is to be understood that the invention is not so limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A transmission, comprising:
   a first planetary gear set, the first planetary gear set including a non-alternatively input-only first input gear and a first non-input/output gear, a first pinion gear meshed therebetween, and a first output planetary carrier carrying the first pinion gear, wherein the first output planetary carrier is alternatively output-only or output-and-input, and the first non-input/output gear is alternatively held when the first output planetary carrier is output-only or released when the first output planetary carrier is output-and-input; and
   a second planetary gear set, the second planetary gear set including a non-alternatively input-only second input gear and a permanently grounded second non-input/output gear, a second pinion gear meshed therebetween, and a non-alternatively output-only second output planetary carrier carrying the second pinion gear; wherein
   the first planetary gear set and the second planetary gear set are the only planetary gear sets interconnected from an input to an output.

2. The transmission of claim 1, wherein the second input gear is connected from the first output planetary carrier.

3. The transmission of claim 1, wherein in the first planetary gear set, the first input gear is a sun gear, and the first non-input/output gear is a ring gear, and in the second planetary gear set, the second input gear is a ring gear, and the second non-input/output gear is a sun gear.

4. The transmission of claim 1, wherein in the first planetary gear set, the first input gear is a sun gear, and the first non-input/output gear is a ring gear, and in the second planetary gear set, the second input gear is a sun gear, and the second non-input/output gear is a ring gear.

5. The transmission of claim 1, wherein in the first planetary gear set, the first input gear is a ring gear, and the first non-input/output gear is a sun gear, and in the second planetary gear set, the second input gear is a ring gear, and the second non-input/output gear is a sun gear.

6. The transmission of claim 1, wherein in the first planetary gear set, the first input gear is a ring gear, and the first non-input/output gear is a sun gear, and in the second planetary gear set, the second input gear is a sun gear, and the second non-input/output gear is a ring gear.

7. The transmission of claim 1, wherein:
   when the first output planetary carrier is output-only and the first non-input/output gear is held, the first planetary gear set has an approximately 1.75 to 2.33 planetary first stage ratio;
   when the first output planetary carrier is output-and-input and the first non-input/output gear is released, the first planetary gear set has a direct first stage ratio; and
   the second planetary gear set has an approximately 1.75 to 2.33 planetary second stage ratio.

8. A vehicle, comprising:
   a drivetrain with a wheel;
   an electric motor; and
   a transmission through which the electric motor is connected to the drivetrain to power the wheel, the transmission including:
   an input from which the electric motor is connected;
   an output to which the drivetrain is connected;
   a first planetary gear set interconnected between the input and the output, the first planetary gear set including a non-alternatively input-only first input gear and a first non-input/output gear, a first pinion gear meshed therebetween, and a first output planetary carrier carrying the first pinion gear, wherein the first output planetary carrier is alternatively output-only or output-and-input, and the first non-input/output gear is alternatively held when the first output planetary carrier is output-only or released when the first output planetary carrier is output-and-input; and
   a second planetary gear set interconnected between the input and the output, the second planetary gear set including a non-alternatively input-only second input gear and a permanently grounded second non-input/output gear, a second pinion gear meshed therebetween, and a non-alternatively output-only second output planetary carrier carrying the second pinion gear; wherein the first planetary gear set and the second planetary gear set are the only planetary gear sets interconnected from the input to the output.

9. The vehicle of claim 8, wherein the first input gear is connected from the input, the second input gear is connected from the first output planetary carrier, and the output is connected from the second output planetary carrier.

10. The vehicle of claim 8, wherein in the first planetary gear set, the first input gear is a sun gear, and the first non-input/output gear is a ring gear, and in the second planetary gear set, the second input gear is a ring gear, and the second non-input/output gear is a sun gear.

11. The vehicle of claim 8, wherein in the first planetary gear set, the first input gear is a sun gear, and the first non-input/output gear is a ring gear, and in the second planetary gear set, the second input gear is a sun gear, and the second non-input/output gear is a ring gear.

12. The vehicle of claim 8, wherein in the first planetary gear set, the first input gear is a ring gear, and the first non-input/output gear is a sun gear, and in the second planetary gear set, the second input gear is a ring gear, and the second non-input/output gear is a sun gear.

13. The vehicle of claim 8, wherein in the first planetary gear set, the first input gear is a ring gear, and the first non-input/output gear is a sun gear, and in the second planetary gear set, the second input gear is a sun gear, and the second non-input/output gear is a ring gear.

14. The vehicle of claim 8, wherein:
when the first output planetary carrier is output-only and the first non-input/output gear is held, the first planetary gear set has an approximately 1.75 to 2.33 planetary first stage ratio;
when the first output planetary carrier is output-and-input and the first non-input/output gear is released, the first planetary gear set has a direct first stage ratio; and
the second planetary gear set has an approximately 1.75 to 2.33 planetary second stage ratio.

15. A transmission, comprising:
a rotary input;
a rotary output;
a first planetary gear set, the first planetary gear set including a rotary first input gear non-alternatively only sharing an upstream rotary connection with the input and a rotary first non-input/output gear, a first pinion gear meshed therebetween, and a rotary first output planetary carrier carrying the first pinion gear;
a second planetary gear set, the second planetary gear set including a rotary second input gear non-alternatively only sharing an upstream rotary connection with the first output planetary carrier and a permanently grounded second non-input/output gear, a second pinion gear meshed therebetween, and a rotary second output planetary carrier carrying the second pinion gear and non-alternatively only sharing a downstream rotary connection with the output;
a rotary connecting clutch between the input and the first output planetary carrier; and
a permanently grounded holding clutch about the first non-input/output gear; wherein
by the operation of the connecting clutch and the holding clutch, the first output planetary carrier alternatively only shares a downstream rotary connection with the second input gear, in which case the first non-input/output gear is held, or shares a downstream rotary connection with the second input gear and shares an upstream rotary connection with the input, in which case the first non-input/output gear is released.

16. The transmission of claim 15, wherein in the first planetary gear set, the first input gear is a sun gear, and the first non-input/output gear is a ring gear, and in the second planetary gear set, the second input gear is a ring gear, and the second non-input/output gear is a sun gear.

17. The transmission of claim 15, wherein in the first planetary gear set, the first input gear is a sun gear, and the first non-input/output gear is a ring gear, and in the second planetary gear set, the second input gear is a sun gear, and the second non-input/output gear is a ring gear.

18. The transmission of claim 15, wherein in the first planetary gear set, the first input gear is a ring gear, and the first non-input/output gear is a sun gear, and in the second planetary gear set, the second input gear is a ring gear, and the second non-input/output gear is a sun gear.

19. The transmission of claim 15, wherein in the first planetary gear set, the first input gear is a ring gear, and the first non-input/output gear is a sun gear, and in the second planetary gear set, the second input gear is a sun gear, and the second non-input/output gear is a ring gear.

20. The transmission of claim 15, wherein:
when the first output planetary carrier only shares a downstream rotary connection with the second input gear and the first non-input/output gear is held, the first planetary gear set has an approximately 1.75 to 2.33 planetary first stage ratio;
when the first output planetary carrier shares a downstream rotary connection with the second input gear and shares an upstream rotary connection with the input and the first non-input/output gear is released, the first planetary gear set has a direct first stage ratio; and
the second planetary gear set has an approximately 1.75 to 2.33 planetary second stage ratio.

* * * * *